(No Model.)  2 Sheets—Sheet 1.

H. V. LOSS.
ROTARY VALVE.

No. 523,077. Patented July 17, 1894.

WITNESSES:
Stevenson H. Walsh
Herman Burgin

INVENTOR
Henrik V. Loss
by his attorney
Chas. A. Rutter.

THE NORRIS PETERS CO., PHOTO-LITHO., WASHINGTON, D. C.

(No Model.) 2 Sheets—Sheet 2.

H. V. LOSS.
ROTARY VALVE.

No. 523,077. Patented July 17, 1894.

WITNESSES:

INVENTOR
Henrik V. Loss
by his attorney
Chas. A. Petit

UNITED STATES PATENT OFFICE.

HENRIK V. LOSS, OF PHILADELPHIA, PENNSYLVANIA.

ROTARY VALVE.

SPECIFICATION forming part of Letters Patent No. 523,077, dated July 17, 1894.

Application filed November 24, 1893. Serial No. 491,845. (No model.)

*To all whom it may concern:*

Be it known that I, HENRIK V. LOSS, a citizen of the United States, and a resident of the city and county of Philadelphia and State of Pennsylvania, have invented certain new and useful Improvements in Rotary Valves, of which the following is a specification.

My invention relates to improvements in rotary hydraulic valves, and the objects of my invention are first, to so arrange openings and grooves for the passage of the liquid in the seat and disk of rotary valves that the pressure between said disk and seat will always be equally balanced about any assumed or given diameter in order to prevent unequal wear between disk and seat and consequent leakage; second, to furnish a rotary hydraulic valve with a device adapted to partly concentrate and centralize the resistance due to the downward pressure of liquid on the disk and thereby correspondingly reduce the friction between the disk and its seat.

Figures 1, 2, 3:
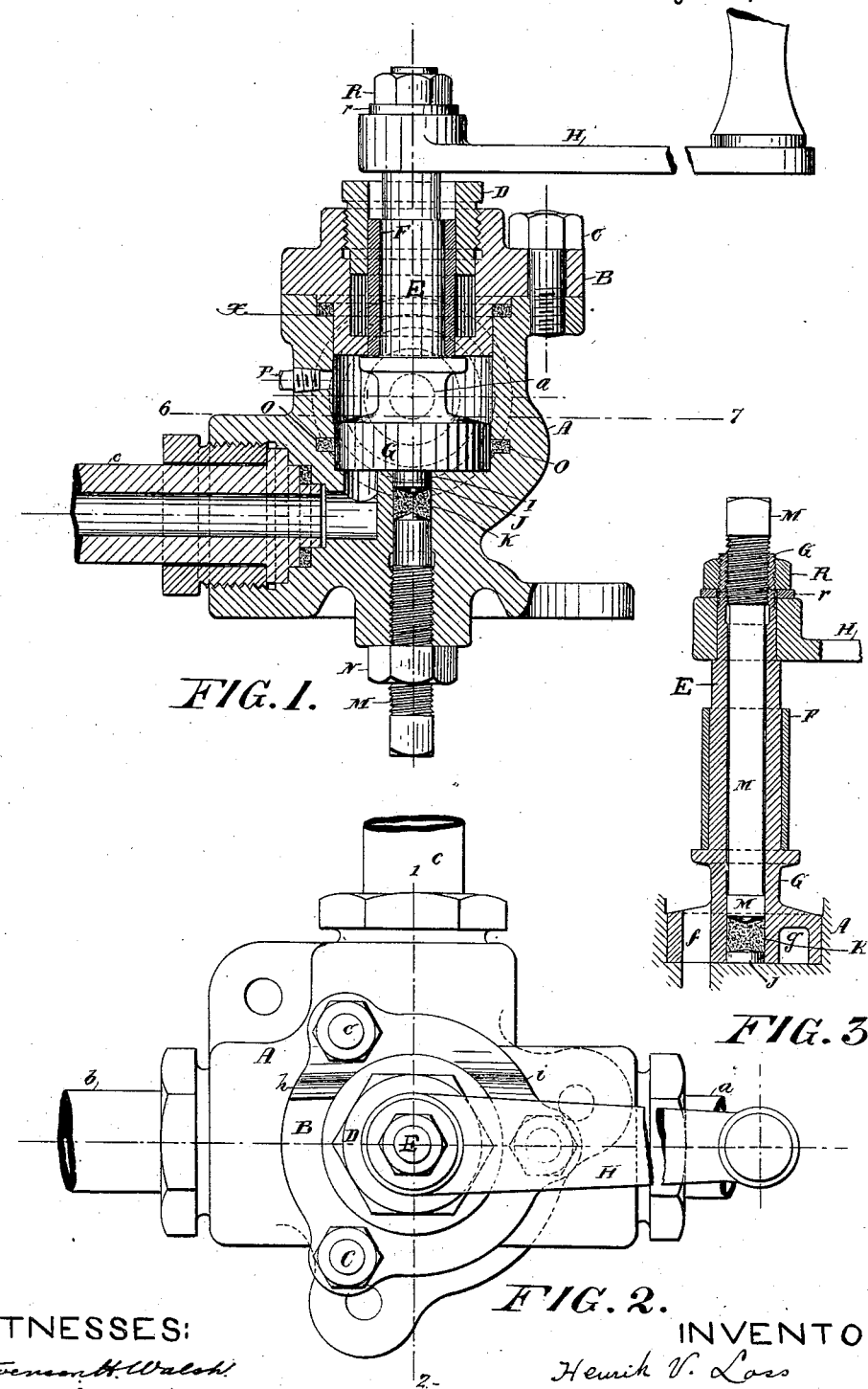
Figures 4, 7:
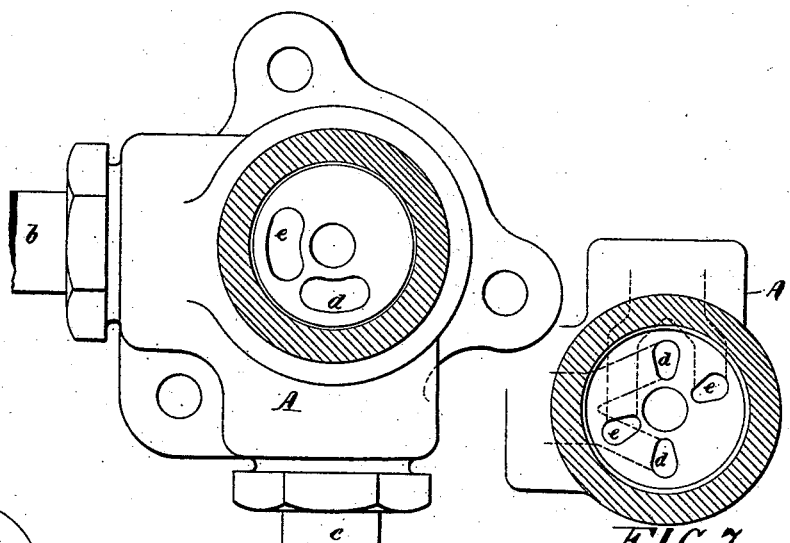
Figure 6:
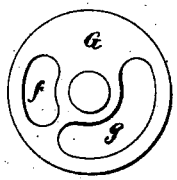
Figure 5:
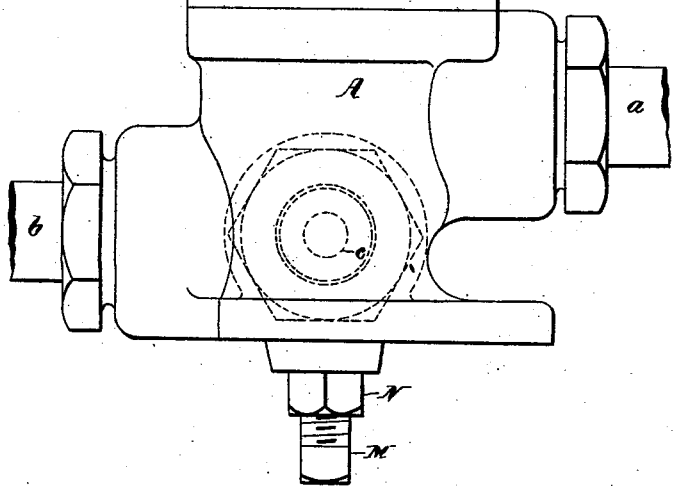

In the accompanying drawings forming part of this specification and in which similar letters of reference indicate similar parts throughout the several views, Figure 1, is a central sectional elevation of a rotary valve embodying my improvements, taken on line 1—2, Fig. 2; Fig. 2, a top plan of the valve; Fig. 3, a central sectional elevation of a disk and stem and part of the valve body, showing a modification of my device for relieving the friction between the disk and its seat; the section of the disk G being made on line 3—4—5, Fig. 8; Fig. 4, a section of Fig. 1, on line 6—7, the spindle being removed showing openings in seat as ordinarily constructed; Fig. 5, a side elevation of valve body, Fig. 2; Fig. 6, a plan of under part or face of valve stem, showing usual arrangement of groove and opening; Fig. 7, a section of Fig. 1, on line 6—7, the spindle being removed showing my improved arrangement of openings in seat, and Fig. 8, a plan of under part of valve stem showing openings and grooves of my improved construction.

A, is the valve body. B a head or cap secured to the valve body by means of studs or bolts C. D a screw gland in the head or cap B and through which the stem E passes.

F is a brass bushing shrunk upon the upper part of stem E to prevent corrosion. G a disk or flange on the lower part of stem E which is hardened and ground to a water tight bearing on its bottom surface of contact with the valve body A.

$a$ is the water inlet to the valve body, $b$ the opening from the valve body to the exhaust, $c$ the opening from the valve body to the machine.

$d$, $e$, Fig. 4, are openings in the valve body leading from the valve seat, the former to the machine, and the latter to the exhaust tank. The machine and exhaust tank are not shown in the drawings.

In the disk or flange G, upon the bottom of the stem E, is a perforation $f$ and a groove $g$, Fig. 6.

The water passes from water inlet $a$ down through perforation $f$ to machine, the groove $g$ partly covering the exhaust opening $e$ and shutting this opening off. If it is desired to exhaust the water from the machine the operating handle H, which is secured to the top of the stem E, is turned around causing the groove $g$ to cover both the holes $d$—$e$, and the water flows from the machine through hole $d$, through groove $g$ to hole $e$, and thence to the exhaust, the perforation $f$ being now closed and inoperative.

$h$—$i$, Figs. 2 and 5, are stops carried by the head or cap B which limit the movement of the operating handle H and determine the position of this handle and the valve stem in their relation to the openings $d$—$e$ in the valve body.

The arrangement and operation of the valve described above is old, and while it operates well when first in use, the unequal distribution of the pressure on the valve seat, due to stem having but one hole and one groove, will immediately, especially for larger dimensions, result in an unequal wear which causes leakage between the stem and body. In order to counteract this I have designed a stem and seat with a number of grooves and a number of holes so arranged that each set of holes and each set of grooves are diametrically opposite, thus equalizing the pressure about any assumed diameter. The body will have to have as many openings as the combined number of grooves and holes in the stem, and the area of the openings to each main outlet should be equal to the area of the outlet itself. By having these openings small the amount of revolution of stem necessary to shut off or open the valve is correspondingly decreased.

Figure 8:
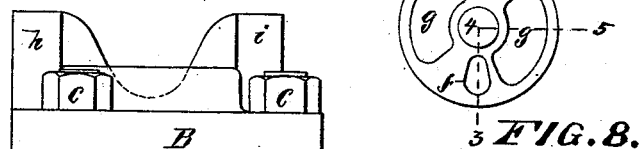

My improved arrangement of valve and seat is shown in Fig. 7, *d—d*, being openings which lead to the machine, *e—e*, openings leading to the exhaust tank. A bottom plan of my improved arrangement of disk is shown in Fig. 8, *f—f*, being openings in the disk, *g—g*, grooves, the openings, *f—f*, being diametrically opposite one another as are also the grooves *g—g*.

The operation of my improvement is similar to that described for the device shown in Figs. 4 and 6, with the exception that the liquid passes through both the perforations *f—f*, in the disk G to the holes in the valve seat, or through both grooves *g—g* from holes *d* to holes *e*.

I Fig. 1, is a central projection extending downward from the face of disk G. J, a hardened steel washer, the upper or flat end of which bears against projection I, and the lower end of which has a conical shape.

K, is an elastic medium, for instance leather, resting against washer J.

M is a screw, having a fine thread, which passes up through the valve body A and bears against the elastic medium K. N, is a jam nut on this screw which serves to lock it in place.

The purpose of the adjusting screw M is to relieve excessive downward pressure on the lower face of the valve stem caused by using liquid under very high pressures, and to reduce the friction between this face of the valve stem and its seat.

Valves of this kind are usually designed to act under some given pressure, if this pressure be increased it causes so much additional friction between the valve stem and its seat as to make it difficult or impossible to rotate the stem. In my valve I overcome this by means of the screw M and the elastic medium K. The screw M may be set up so that the elastic medium will bear against the center of the lower face of the disk, and the resistance due to the downward pressure of the liquid on the disk will be concentrated and centralized on this elastic medium and screw, and the friction between the disk and its seat will be correspondingly reduced. By setting the screw M up or down the valve may be rendered operative under any varying degrees of pressure of liquid within it. If the elastic medium were not interposed, and the screw M bore directly against the washer J a rotation of the screw would simply lift the stem bodily up from its seat and thus cause leakage.

The conical face of the washer J bears against the elastic medium K and serves not only to expand the elastic medium, but also to protect it from injury during the rotation of the valve, as the washer remains perfectly stationary during the movements of this latter.

O, is a packing ring in the valve body which bears against the disk G and prevents liquid from passing down between the valve body and this disk.

P, is a screw closing an orifice in the valve body through which oil may be introduced to lubricate the working parts.

R is a nut upon the upper end of the valve stem E, *r*, a washer below this nut and bearing on the operating handle H, the purpose of this nut and washer being to hold the operating handle in place upon the valve stem.

*x* is an elastic packing interposed between body A and cap B which is held in place by the pressure of the bolts C, the purpose of this is to prevent water, when under excessive pressure, from finding its way out between body and cap. A mere metal to metal contact has been found in practice insufficient for heavy pressure.

In Fig. 3, a modification of my invention is shown, in this case the adjusting screw M, instead of passing upward through the valve body as shown in Fig. 1, passes downward through the valve stem and disk, which are drilled out to receive it. The upper part of the hole in the valve stem is threaded to receive the thread of the screw M. The elastic medium K is placed beneath the screw M, and the washer J is placed with its conical face bearing against the elastic medium K and with its flat face resting upon the valve seat. The operation of this modification is precisely similar to that of the adjusting screw shown in Fig. 1.

Having thus described my invention, I claim as new and desire to secure by Letters Patent—

The combination in a rotary valve of a perforated valve seat, a disk bearing against said valve seat, a central elastic medium and a central pin bearing against said elastic medium and adapted to receive and resist the pressure between said disk and said valve seat and thereby to that extent relieve the under part of said disk therefrom.

HENRIK V. LOSS.

Witnesses:
CHRISTOPHER FALLON,
CHAS. A. RUTTER.